(12) United States Patent
Yuan et al.

(10) Patent No.: US 12,072,188 B2
(45) Date of Patent: Aug. 27, 2024

(54) APPARATUS, SYSTEMS AND METHODS FOR DETECTING LIGHT

(71) Applicant: PANTECH CORPORATION, Seoul (KR)

(72) Inventors: Xin Yuan, New Providence, NJ (US); Paul Wilford, Bernardsville, NJ (US); Mu Qiao, Summit, NJ (US); Xuan Liu, Berkeley Heights, NJ (US)

(73) Assignee: PANTECH CORPORATION, Seoul (KR)

( * ) Notice: Subject to any disclaimer, the term of this patent is extended or adjusted under 35 U.S.C. 154(b) by 339 days.

(21) Appl. No.: 17/605,946

(22) PCT Filed: Apr. 16, 2020

(86) PCT No.: PCT/US2020/028446
§ 371 (c)(1),
(2) Date: Oct. 22, 2021

(87) PCT Pub. No.: WO2020/219328
PCT Pub. Date: Oct. 29, 2020

(65) Prior Publication Data
US 2022/0196385 A1    Jun. 23, 2022

(30) Foreign Application Priority Data
Apr. 25, 2019 (EP) .................... 19171230

(51) Int. Cl.
*G01B 9/02091* (2022.01)
*G01B 9/02015* (2022.01)
(Continued)

(52) U.S. Cl.
CPC ..... *G01B 9/02091* (2013.01); *G01B 9/02027* (2013.01); *G01B 9/0203* (2013.01);
(Continued)

(58) Field of Classification Search
CPC ............ G01B 9/02091; G01B 9/02027; G01B 9/0203; G01B 9/02004; G01B 2290/20; G01B 2290/70; G01J 3/0224; G01J 3/0229
See application file for complete search history.

(56) References Cited

U.S. PATENT DOCUMENTS 5,321,502 A    6/1994 Matsumoto et al.
5,994,690 A    11/1999 Kulkarni et al.
(Continued)

FOREIGN PATENT DOCUMENTS

CN    104483291 A    4/2015
EP     3477246 A1    5/2019
(Continued)

OTHER PUBLICATIONS

Pircher et al "Polarization sensitive optical coherence tomography in the human eye," Progress in Retinal and Eye Research, vol. 30, Issue 6, 2011, pp. 431-451, ISSN 1350-9462, https://doi.org/10.1016/j.preteyeres.2011.06.003 (Year: 2011).*
(Continued)

*Primary Examiner* — Uzma Alam
*Assistant Examiner* — Jonathon Cook
(74) *Attorney, Agent, or Firm* — Womble Bond Dickinson (US) LLP (57) ABSTRACT

An apparatus comprising: a double path interferometer comprising a sample path for an object and a reference path; a source of linearly polarized light for the double path interferometer, a phase plate positioned in the sample path; means for superposing the sample path and reference path to create a beam of light for detection; means for spatially modulating the beam of light to produce a modulated beam of light; means for dispersing the modulated beam of light to produce a spatially modulated and dispersed beam of
(Continued)

light; a first detector; a second detector, and means for splitting the spatially modulated and dispersed beam of light, wherein light of a first linear polarization is directed to the first detector and light of a second linear polarization, orthogonal to the first linear polarization, is directed to the second detector.

18 Claims, 3 Drawing Sheets

(51) Int. Cl.
  *G01J 3/02* (2006.01)
  *G01B 9/02004* (2022.01)
(52) U.S. Cl.
  CPC .......... *G01J 3/0224* (2013.01); *G01J 3/0229* (2013.01); *G01B 9/02004* (2013.01); *G01B 2290/20* (2013.01); *G01B 2290/70* (2013.01)

(56) References Cited

U.S. PATENT DOCUMENTS

| | | | |
|---|---|---|---|
| 7,227,645 | B2 | 6/2007 | Cyr |
| 8,040,608 | B2* | 10/2011 | Evans ............... G01N 21/6458 359/590 |
| 8,619,184 | B2 | 12/2013 | Podoleanu |
| 9,243,888 | B2* | 1/2016 | Tkaczyk ............... G01J 3/453 |
| 2008/0285043 | A1 | 11/2008 | Fercher et al. |
| 2010/0182609 | A1* | 7/2010 | Wang ............... G01B 9/02091 356/491 |
| 2014/0374573 | A1* | 12/2014 | Arce ......................... G01J 3/06 250/208.1 |
| 2015/0109623 | A1* | 4/2015 | Abdulhalm ........ G01B 9/02004 356/479 |
| 2016/0356823 | A1 | 12/2016 | Gu et al. |
| 2018/0146851 | A1 | 5/2018 | Frisken et al. |
| 2018/0228363 | A1 | 8/2018 | Frisken et al. |
| 2021/0396509 | A1* | 12/2021 | Bouma ............... G01N 21/4795 |

FOREIGN PATENT DOCUMENTS

| | | |
|---|---|---|
| EP | 3653987 | 5/2020 |
| JP | 2011/237272 A | 11/2011 |
| WO | WO 2019/185992 | 10/2019 |

OTHER PUBLICATIONS

Tsai et al. "Coded aperture snapshot spectral polarization imaging," Appl. Opt. 52, 2153-2161 (2013) (Year: 2013).*
Baumann et al "Polarization-sensitive optical coherence tomography imaging of the anterior mouse eye," J. Biomed. Opt. 23(8) 086005 (Aug. 30, 2018) https://doi.org/10.1117/1.JBO.23.8.086005 (Year: 2018).*
Lee et al "High-speed spectral domain polarization-sensitive optical coherence tomography using a single camera and an optical switch at 1.3 μm," J. Biomed. Opt. 15(1) 010501 (Jan. 1, 2010) https://doi.org/10.1117/1.3277668 (Year: 2010).*
Cense et al "Spectral-domain polarization-sensitive optical coherence tomography at 850 nm," Proc. SPIE 5690, Coherence Domain Optical Methods and Optical Coherence Tomography in Biomedicine IX, (Apr. 13, 2005); https://doi.org/10.1117/12.592840 (Year: 2005).*
Baumann et al "Single camera based spectral domain polarization sensitive optical coherence tomography," Opt. Express 15, 1054-1063 (2007) (Year: 2007).*
Mujat et al "Autocalibration of spectral-domain optical coherence tomography spectrometers for in vivo quantitative retinal nerve fiber layer birefringence determination," J. Biomed. Opt. 12(4) 041205 (Jul. 1, 2007) https://doi.org/10.1117/1.2764460 (Year: 2007).*
Gotzinger et al "Polarization maintaining fiber based ultra-high resolution spectral domain polarization sensitive optical coherence tomography," Opt. Express 17, 22704-22717 (2009) (Year: 2009).*
Extended European Search Report for European Application No. 19171230.6 dated Nov. 4, 2019, 8 pages.
Hagen et al., "Review of Snapshot Spectral Imaging Technologies", Optical Engineering, Soc. of Photo-Optical Instrumentation Engineers, vol. 52, No. 9, (Sep. 1, 2013), 24 pages.
International Search Report and Written Opinion for Patent Cooperation Treaty Application No. PCT/US2020/028446 dated Jul. 21, 2020, 8 pages.
Liao et al., "Measurement of Multiple Optical Parameters of Birefrigent Sample Using Polarization-Sensitive Optical Coherence Tomography", IEEE Journal of Lightwave Technology, vol. 27, No. 5, (Mar. 1, 2009), 11 pages.
U.S. Appl. No. 62/649,972, filed Mar. 29, 2018; In re: Jalali et al., entitled "Method and Apparatus for Reconstructing a Signal Captured by a Snapshot Compressive Sensing System", 35 pages.
Yasuno et al., "Optical Coherence Tomography by Spectral Interferometric Joint Transform Correlator", Optics Communications 186 (1-3), (Dec. 1, 2000), pp. 51-56.
Office Action for European Application No. 19171230.6 dated Oct. 17, 2022, 4 pages.

* cited by examiner

APPARATUS, SYSTEMS AND METHODS FOR DETECTING LIGHT

CROSS-REFERENCE TO RELATED APPLICATIONS

This application is a national phase entry of International Application No. PCT/US2020/028446, filed Apr. 16, 2020, the entire contents of which are incorporated herein by reference.

TECHNOLOGICAL FIELD

Examples of the disclosure relate to apparatus, systems and methods for detecting light. In particular they relate to apparatus, systems and methods for detecting light from an optical coherence tomography arrangement.

BACKGROUND

Optical coherence tomography enables cross sectional imaging of an object such as a retina by detecting the light reflected from internal structures within the object.

Existing optical coherence tomography can be performed by scanning in a spatial domain or scanning in a spectral domain.

It is useful to provide means for detecting the light from optical coherence tomography arrangements which enable a high-quality image to be obtained.

BRIEF SUMMARY

According to various, but not necessarily all, embodiments of the invention there is provided an apparatus comprising:
a double path interferometer comprising a sample path for an object and a reference path;
a source of linearly polarized light for the double path interferometer;
a phase plate positioned in the sample path;
means for superposing the sample path and reference path to create a beam of light for detection;
means for spatially modulating the beam of light to produce a modulated beam of light;
means for dispersing the modulated beam of light to produce a spatially modulated and dispersed beam of light;
a first detector;
a second detector; and
means for splitting the spatially modulated and dispersed beam of light, wherein
light of a first linear polarization is directed to the first detector and light of a second linear polarization, orthogonal to the first linear polarization, is directed to the second detector.

In some but not necessarily all examples, the double path interferometer is configured so that the sample path reflects from the object.

In some but not necessarily all examples, the sample path passes through the phase plate before reflection from the object and also after reflection from the object.

In some but not necessarily all examples, the double path interferometer is configured to provide linearly polarized light, that has a first linear polarization, to the phase plate and wherein the phase plate is configured to convert light that has the first linear polarization and is travelling towards the object to an intermediate elliptical polarization and is configured to convert light that has the intermediate elliptical polarization and is travelling from the object to a linear polarization that has a linear polarization component that is orthogonal to the first linear polarization.

In some but not necessarily all examples, the means for modulating the input beam of light comprises a spatially coded aperture.

In some but not necessarily all examples, the spatially coded aperture is a two-dimensional spatially coded aperture comprising at least a first plurality of portions having a first transparency that are spatially distributed in two dimensions and at least a second plurality of portions having a second different transparency that are spatially distributed in two dimensions. In some but not necessarily all examples, the portions are an array of pixelated portions that are arranged in rows and columns. In some but not necessarily all examples, the pixelated portions having different transparencies are arranged in a random two-dimensional pattern.

In some but not necessarily all examples, the means for dispersing the input beam of light provides dispersion in a single dispersion direction. In some but not necessarily all examples, the dispersion direction is aligned with rows or columns of pixels in the first detector and the second detector and/or the dispersion direction is aligned with rows or columns of modulating pixels in the means for modulating.

In some but not necessarily all examples, the means for dispersing comprises one or more refractive elements. In some but not necessarily all examples, the means for dispersing the modulated beam of light comprises at least one prism or one grating.

In some but not necessarily all examples, the source of linearly polarized light provides light that has a range of different wavelengths, the range (bandwidth) being greater than 20 nm, for example between 20 nm and 50 nm wherein the range of different wavelengths of light provides spectral domain information about different depths within the object without spectral domain scanning.

According to various, but not necessarily all, embodiments of the invention there is provided a system comprising the apparatus. The system or apparatus comprises processing means for modifying a measurement from the first detector by subtracting a re-scaled version of a measurement from the second detector and a system dependent correction.

In some but not necessarily all examples, the processing means is configured to re-scale the measurement from the second detector using a parameter defined by the phase plate.

In some but not necessarily all examples, the processing means is configured to re-scale the measurement from the second detector using tan 2θ, where a fast axis of the phase plate is at an angle θ relative to the first linear polarization direction.

In some but not necessarily all examples, the processing means is configured to process the modified measurement from the first detector to produce a three-dimensional image of the object According to various, but not necessarily all, embodiments of the invention there is provided an optical coherence tomography apparatus comprising:
a double path interferometer comprising a sample path for an object and a reference path;
a source of linearly polarized light for the double path interferometer
a phase plate positioned in the sample path
means for superposing the sample path and reference path to create a beam of light for detection a first detector a second detector means for splitting the beam of light for detection, wherein light of a first linear polarization is directed to the first detector and light of a second linear polarization, orthogonal to the first linear polarization, is directed to the second detector.

The beam of light for detection, can be spatially modulated and dispersed before being split by the means for splitting.

According to various, but not necessarily all, embodiments of the invention there is provided apparatus comprising:

a spatially coded aperture for spatially modulating an input beam of light wherein the input beam of light is obtained from an optical coherence tomography arrangement and has a range of wavelengths greater than 20 nm, for example between 20 nm and 50 nm, the spatially coded aperture comprising at least multiple spatially distributed non-overlapping first portions, that are distributed over an area in two dimensions and have a first level of transparency to the input beam of light and at least multiple spatially distributed non-overlapping second portions that are distributed over the area in two dimensions and have at least a second, different level of transparency to the input beam of light, wherein the spatially distributed first portions and the spatially distributed second portions do not overlap and are arranged as an array in rows and columns, the first portions forming a two-dimensional pattern that is different to a two-dimensional pattern formed by the second portions;

a prism for dispersing the modulated beam of light wherein the prism is configured to cause dispersion in a first direction, wherein the first direction is aligned with the rows or columns of the spatially coded aperture;

at least one detector comprising sensors arranged as an array in rows and columns wherein at least one of the rows or columns is aligned with the first direction.

In some but not necessarily all examples, the spatially distributed first portions and the spatially distributed second portions can be contiguous and completely fill the area.

In some but not necessarily all examples, the size of the first and second pixel portions of the spatially coded aperture when projected onto the detector, can be directly proportional to a size of pixels of the detector.

In some but not necessarily all examples, a bandwidth of the beam of light corresponds, through the prism, to a maximal spatial shift between spatially coded aperture patterns for different wavelengths and the pattern of the spatially coded aperture does not repeat in the direction of the spatial shift for at least a distance corresponding to the maximal spatial shift.

In some but not necessarily all examples, the detector provides, in a single shot, without spatial or spectral scanning, spectral domain information that can be used to produce a three-dimensional image of an object.

In some but not necessarily all examples, the apparatus comprises a processor and memory for processing the output of the detector to produce a three-dimensional image of an object.

According to various, but not necessarily all, embodiments of the invention there is provided apparatus comprising:

means for spatially modulating an input beam of light wherein the input beam of light is obtained from an optical coherence tomography arrangement, has a bandwidth greater than 20 nm for example between 20 nm and 50 nm and is full-field;

means for dispersing the modulated beam of light across the full field; and means for detecting the spatially modulated and dispersed beam of light across the full-field and converting the detected beam of light into an electrical output signal.

According to various, but not necessarily all, embodiments of the invention there is provided apparatus comprising:

means for modulating an input beam of light wherein the input beam of light is obtained from an optical coherence tomography arrangement; means for dispersing the modulated beam of light; and means for detecting the dispersed beam of light and converting the detected beam of light into an electrical output signal.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

Examples of the disclosure relate to an apparatus 1 which can be used as a detector for an optical coherence tomography (OCT) arrangement 17. The apparatus 1 provides for compressed sampling of the input beam of light and disperses different bandwidths of the beam of light. This enables a low cost detector 7 such as a charge-coupled device (CCD) to be used within the apparatus to detect the beams of light.

Figure 1:
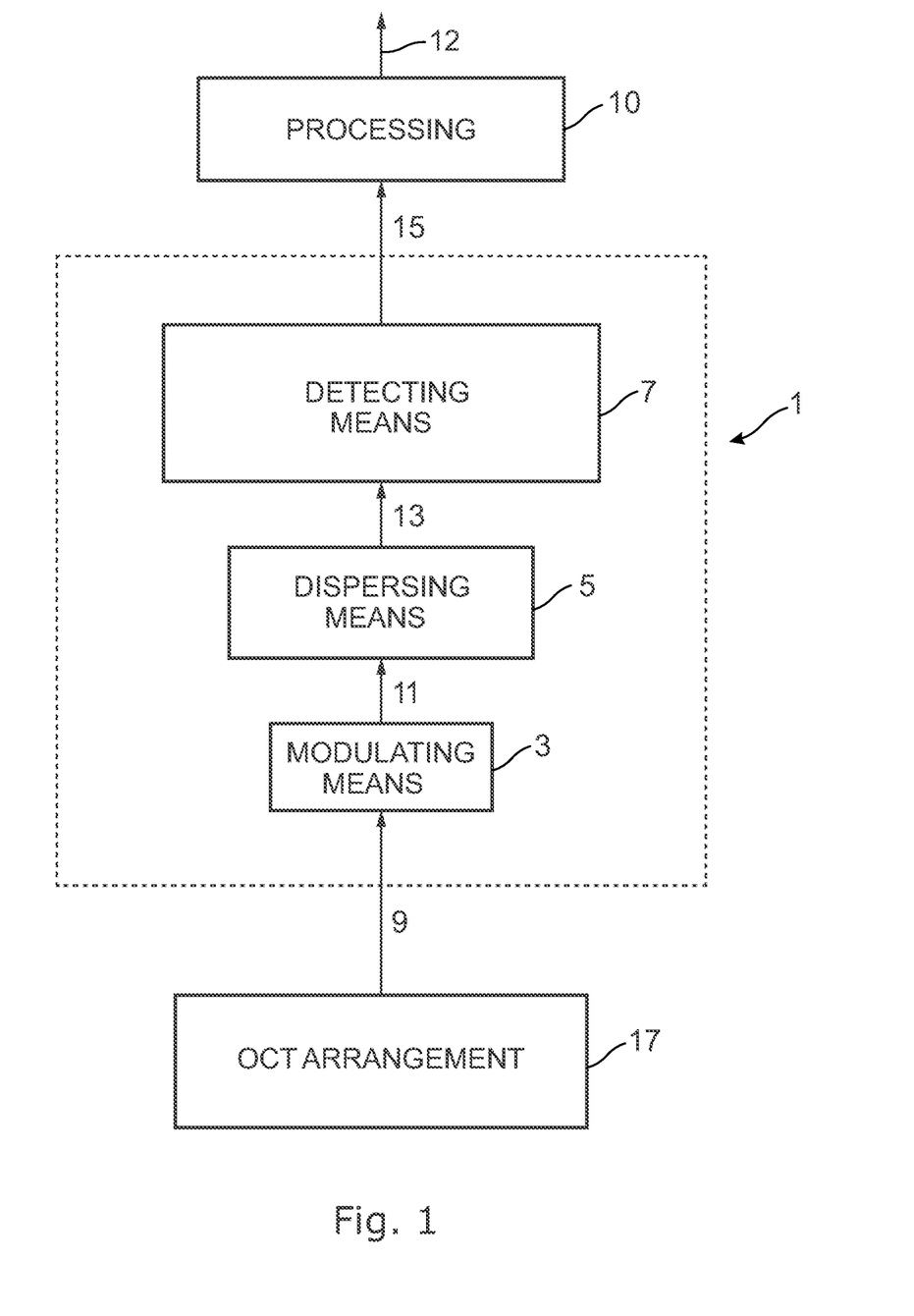
FIG. 1 illustrates an example apparatus.

FIG. 1 schematically illustrates an example apparatus 1. The example apparatus 1 comprises means 3 for modulating an input beam of light 9 wherein the input beam of light 9 is obtained from an optical coherence tomography arrangement 17; means 5 for dispersing the modulated beam of light 11; and means 7 for detecting the dispersed beam of light 13 and converting the detected beam of light into an electrical output signal 15. Processing means 10 is configured to process the electrical output signal 15 to provide an output 12.

The means 3 for modulating (or modulating means 3) can, in some examples, comprise one or more modulators. The means for modulating can be means 3 for spatially modulating (spatial modulation means 3) and can, in some examples, comprise one or more spatial modulators. An example of a spatial modulator is a spatially coded aperture.

In the example of FIG. 1, a modulator 3 is arranged within the apparatus 1 so that when the apparatus 1 is coupled to an OCT arrangement 17, an input beam of light 13 from the OCT arrangement 17 is incident, at least in part, upon the modulator 3.

The modulator 3 enables compressed sampling of the input beam of light 9. The modulator 3 may selectively remove information from the input beam of light 9 so that only portions of the input beam of light 9 are detected. In some examples the modulator 3 may be arranged to convert a three-dimensional signal [x, y, λ] into a two-dimensional signal [x, y].

The modulator 3 may comprise any means which may be arranged to spatially modulate the input beam of light 9. The spatial modulation occurs over a transverse cross-sectional area of the input beam of light 9. The modulation comprises amplitude modulation that varies in dependence upon a location within the transverse cross-sectional area of the input beam of light 9.

In some examples the modulator 3 comprises a spatially coded aperture. The spatially coded aperture provides for spatial modulation over a cross-sectional area of the input beam of light 9 that passes through the coded aperture. The coded aperture is coded to provide amplitude modulation that varies in dependence upon a location within the aperture. The coded aperture defines a fixed two-dimensional pattern of spatially varying transparency. The spatially coded aperture physically modulates the beam of light to a spatially compressed/sparse format.

The spatially coded aperture may comprise a non-uniform optical mask or any other suitable type of aperture that provide amplitude modulation that varies in dependence upon a location within the aperture.

The spatially coded aperture may be a two-dimensional spatially coded aperture or any other suitable type of aperture. The two-dimensional spatially coded aperture defines a two-dimensional plane. The beam of light 9 may travel in a direction normal (orthogonal) to the two-dimensional plane.

In other examples the modulator 3 could comprise a liquid crystal on silicon (LCOS) modulator, or any other suitable type of modulator 3.

The modulator 3 can comprise multiple different portions that have a particular transparency. In some examples the modulator 3 may comprise at least a first portion having a first level of transparency to the input beam of light 9 and at least a second portion having a second, different level of transparency to the input beam of light 9. In some examples the modulator 3 may comprise at least multiple spatially distributed non-overlapping first portions, that are distributed over an area in two dimensions and have a first level of transparency to the input beam of light 9 and at least multiple spatially distributed non-overlapping second portions that are distributed over the area in two dimensions and have a second, different level of transparency to the input beam of light 9. In at least some examples, the spatially distributed first portions and the spatially distributed second portions do not overlap. The spatially distributed first portions and the spatially distributed second portions can be contiguous and, in some examples, the spatially distributed first portions and the spatially distributed second portions completely fill the area. The different levels of transparency may allow different levels of light to pass through the modulator 3. In some examples the modulator 3 may be a binary modulator 3 so that only two different absorbencies are provided by the respective portions of the modulator 3. In other examples the modulator 3 may be a grey-scale modulator and may comprise more than two different levels of transparency in the different portions of the modulator 3.

The different portions of the modulator 3 may be arranged in any suitable pattern. In some examples the respective portions of the modulator 3 having different transparencies are pixelated and arranged in a pixelated pattern. The pixelated arrangement may have the respective portions of the modulator 3 arranged in an array of columns and rows of pixels. In some examples, the pixels are square or rectangular.

The coded aperture can comprise multiple different portions that are coded with a particular transparency, for example, the coded aperture can be pixelated and comprise multiple different portions (pixels) that are arranged as an array in rows and columns, where the pixels are coded with a particular transparency. The two-dimensional pattern of pixels (portions) that have a first transparency is different to the two-dimensional pattern of pixels (portions) that have a second transparency, different to the first transparency.

The transparency at each pixel defines a fixed two-dimensional pattern of spatially varying transparency. In some examples, the transparency at each pixel in a row defines a fixed one-dimensional pattern of spatially varying transparency that does not repeat or does not repeat within a minimum number of columns. In some examples, the transparency at each pixel in a column defines a fixed one-dimensional pattern of spatially varying transparency that does not repeat or does not repeat within a minimum number of rows. In some examples, the transparency at each pixel defines a fixed two-dimensional pattern of spatially varying transparency that has a random or pseudorandom spatial distribution. In some examples, the pixels are coded as either opaque or transparent. In other examples, the pixels are coded using grey scale.

The size p of the pixels when projected onto a detector 7, can be directly proportional to a size d of pixels of the detector 7.

The number of transparent pixels, partially transparent pixels, and opaque pixels in a spatially coded aperture can vary in different implementations of the disclosure. In some examples approximately half of the pixels of the modulator could be absorbent so that half of the incident area of the modulator acts to block the input beam of light 9 while the other half allows the incident beam of light to pass, or partially pass through in a spatially-coded format.

In some examples the different portions (e.g. pixels) of the modulator 3 may be arranged in a random pattern (which encompasses pseudo random patterns) that is random in two dimensions. The random pattern may be an irregular pattern. The random pattern might not be defined or arranged in relation to any specific object. In other examples the respective portions (e.g. pixels) of the modulator 3 may be arranged in a predetermined pattern. The predetermined pattern may be selected according to the object or type of object that is to be imaged by the OCT system.

In some examples the modulator 3 may be fixed in position relative to the other components of the apparatus 1. In other examples the modulator 3 may be arranged to be moveable between imaging measurements relative to the other components of the apparatus 1. In particular the modulator 3 may be moveable so that the modulator 3 can be shifted relative to the means 5 for dispersing the modulated beam of light 11 and the means 7 for detecting the dispersed beam of light 13.

In some examples the transparency of the portions of the modulator 3 may be wavelength dependent. In such examples the modulation of the input beam of light 9 by the respective portions of the modulator 3 will be dependent upon the wavelengths within the input beam of light 9.

The beam of light 9 has a broad spectrum (it is broadband). It comprises light that has a broad frequency spectrum. The beam of light 9 can, for example, comprise light that has wavelengths that differ by over 20 nm for example between 20 nm and 50 nm.

The modulator 3 provides a spatially modulated beam of light 11 as an output.

The means 5 for dispersing the modulated beam of light 11 is arranged within the apparatus 1 so that the spatially modulated beam of light 11, or at least part of the spatially modulated beam of light 11, provided by the modulator 3 is incident upon the means 5 for dispersing the modulated beam of light 11. Dispersion converts a spectral difference (a difference in wavelength of the light) into a spatial offset.

The means 3 for dispersing can, in some examples, comprise one or more disperser elements.

The dispersing means 5 is configured to cause a wavelength dependent spatial shift of the same fixed spatially coded aperture, defined by the modulator 3. In at least some examples the spatial shift is only in the plane of the aperture/beam (2D dispersion). In at least some examples, the spatial shift is only in one dimension (1 D dispersion). That one dimension can be aligned with a row (or a column) of pixels in the spatially coded aperture and/or pixels of the detector 7.

The means 5 for dispersing the modulated beam of light 11 (dispersing means 3) may comprise one or more dispersing elements. The dispersing elements 5 may comprise any elements which cause different wavelengths of the modulated beam of light 11 to be dispersed by different amounts. The one or more dispersing elements 5 may comprise a refractive element, for example a prism, or a diffractive element, for example a grating, or any other suitable elements.

The dispersing means 5 can be a prism. A prism is a polyhedron with two faces parallel, and with surface normals of the other faces lying in the same plane.

The prism can be a triangular prism. The triangular prism can have a constant triangular cross-section that has a shape of an isosceles triangle or an equilateral triangle.

The bandwidth of the beam of light corresponds, through the dispersing means 5, to a maximal spatial shift between spatially coded aperture patterns for different wavelengths. In at least some examples, the pattern of the spatially coded aperture does not repeat in the direction of the spatial shift for at least a distance corresponding to the maximal spatial shift.

The dispersing elements 5 provide a spatially modulated and dispersed beam of light 13 as an output. The means 7 for detecting the dispersed beam of light 13 is arranged within the apparatus 1 so that the spatially modulated and dispersed beam of light 13, or at least part of the spatially modulated and dispersed beam of light 13, is incident on the means 7 for detecting the dispersed beam of light 13.

The means 7 for detecting the dispersed beam of light 13 comprises a detector 7. The detector 7 may be arranged to transduce an incident beam of light into an electrical output signal 15. In some examples the detector 7 may comprise a charge-coupled device, complementary metal-oxide semiconductor (CMOS) sensors or any other suitable type of sensors.

In some examples the detector 7 may comprise a two-dimensional array of sensors (pixels).

The spatially modulated beam of light 11 is a sparse three-dimensional data cube [x, y, λ] with a two-dimensional slice [x,y] for each wavelength channel coded by the same fixed spatially coded aperture 3 that has variable transparency in the x-y plane. The spatially modulated and dispersed beam of light 13 represents a skewed version of the sparse three-dimensional data cube. The skew (offset), caused by the dispersing means 5, is within the x-y plane and is proportional to wavelength. In the example illustrated in FIG. 2 it is in the y-direction only. Each spatially coded two-dimensional slice [x,y] for each wavelength channel n is shifted (offset) $y_n$. The detector 7 detects the superposition of the offset spatially coded two-dimensional slices [x,y] for each wavelength channel. This reduces the sparse three-dimensional data cube to a two-dimensional projection in a single shot. It collapses overlapping differently masked spectrograms for different channels to a single spectrogram.

In other examples the detector 7 may comprise a linear detector which may be scanned across a detecting plane.

The output signal 15 provided by the detector 7 therefore comprises information indicative of the three-dimensional object imaged by the OCT arrangement 17.

In some but not necessarily all examples, the processing means 10 processes the output signal 15, for example using non-linear optimization, to produce a three-dimensional image of the object. The processing means 10 can be a part of the apparatus 1 or, as shown, separate from the apparatus 1. In some examples, the processing means 10 is remote from the apparatus 1. The processing means 10 can comprise a processor or controller and memory.

This produced three-dimensional image can be rendered on a display or other suitable user output device.

Figure 2:
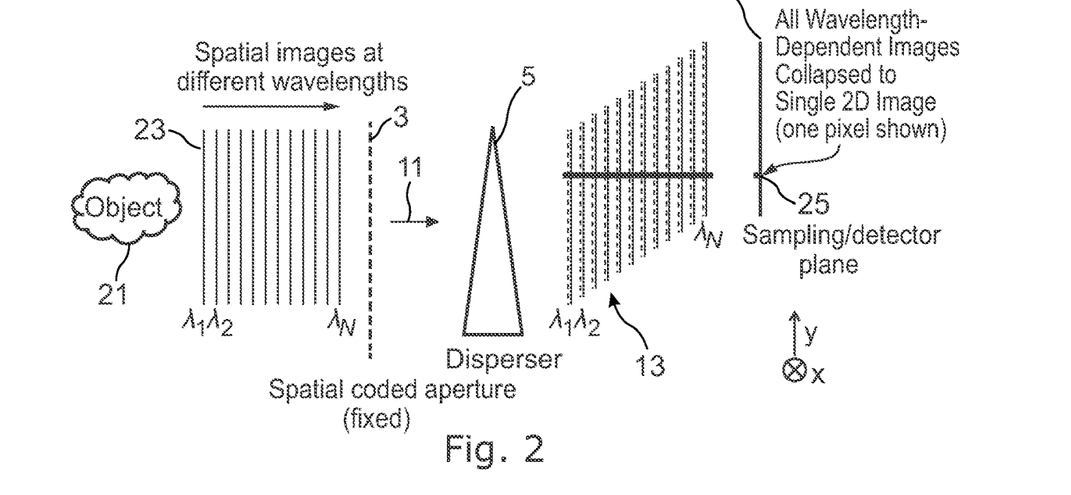
FIG. 2 illustrates an imaging principle.

FIG. 2 shows an imaging principle of examples of the disclosure.

In the example of FIG. 2 an OCT arrangement (not shown for clarity) is used to image a three-dimensional object 21. The object 21 reflects broadband light which has been directed onto the object 21. Different wavelengths of the incident light are reflected differently depending upon the internal structure of the object 21. This provides a plurality of spatial images 23. Each of the spatial images 23 corresponds to a different wavelength of light $\lambda_1$ to $\lambda_n$. The different spatial images 23 therefore comprise information about the internal structure of the object 21. The different spatial images 23 define a three-dimensional signal [x, y, λ].

The reflected beam of light 9 is a three-dimensional data cube [x, y, λ] with a two-dimensional slice [x,y], a spatial image 23, for each wavelength channel.

In the example of FIG. 2 the modulator 3 comprises a two-dimensional spatially coded aperture. Other types of modulator 3 may be used in other examples of the disclosure, for example as previously described.

The spatial images 23 in the input beam of light 9 are modulated by the spatially coded aperture to produce a spatially modulated beam of light 11.

The spatially modulated beam of light 11 is a sparse three-dimensional data cube [x, y, λ] with a two-dimensional slice [x,y] for each wavelength channel coded by the same fixed spatially coded aperture that has variable transparency in the x-y plane.

The spatially modulated beam of light 11 provided by the modulator 3 is then spread by the dispersing element 5. In the example of FIG. 2 the dispersing element 5 comprises a triangular prism. Other types of dispersing element 5 could be used in other examples of the disclosure, as previously described. In this example, the dispersing element 5 refracts the modulated beam of light 11 to spatially spread the modulated beam of light in the y-direction only. Different wavelengths of the spatial images 23 are spread by a different amount in the y-direction as shown schematically in FIG. 2. The distance by which a spatial image 23 is spread by the dispersing element 5 is dependent upon (e.g. proportional to) the wavelength of the spatial image 23.

The spatially modulated and dispersed beam of light 13 represents a skewed version of sparse three-dimensional data cube. The skew (offset), caused by the dispersing means 5, is within the x-y plane and is proportional to wavelength. In the example illustrated in FIG. 2 it is in the y-direction only. Each spatially coded two-dimensional slice [x,y] for each wavelength channel n is shifted (offset) $y_n$.

The spatially modulated and dispersed beam of light 13 is then incident upon the detector 7. The detector 7 comprises a plurality of pixels 25. Only one pixel 25 is shown for clarity in FIG. 2. The plurality of pixels 25 may be arranged in any suitable array. In the example of FIG. 2 the plurality of pixels 25 may be arranged in a matrix array comprising rows and columns. Each pixel 25 detects the summation of the modulated and dispersed beam of light 13 for each of the different wavelengths $\lambda_1$ to $\lambda_n$ for the area covered by the pixel 25.

As the different wavelengths $\lambda_1$ to $\lambda_n$ in the dispersed beam of light 13 are shifted by different amounts the different wavelengths $\lambda_1$ to $\lambda_n$ that are incident on a given pixel of the detector 7 have passed though different portions of the modulator 3. This means that the different wavelengths $\lambda_1$ to $\lambda_n$ that are incident on a given pixel 25 of the detector 7 may be modulated by different amounts.

The detector 7 detects the superposition of the offset spatially coded two-dimensional slices [x,y] for each wavelength channel. This reduces the sparse three-dimensional data cube to a compressed two-dimensional projection in a single shot. It collapses overlapping differently masked spectrograms for different channels to a single spectrogram.

In the above examples the input beam of light 9 can be represented as NA wavelength channels. Each of the wavelength channels has a spatial size $N_x \times N_y$.

The signal provided to the detector 7 may be represented as $S_m(x, y)$ where:

$$S_m(x,y) = \int_\lambda S_0(x,y,\lambda) M(x,y,\lambda) d\lambda.$$

The measurement z, of $S_m(x, y)$, obtained by the $(i, j)^{th}$ pixel where $z \in \mathbb{R}^{N_x \times N_y}$ is given by equation 1

$$z(i,j) = \Sigma_{n\lambda=1}^{N\lambda} S_0(i,j,n_\lambda) M(i,j,n_\lambda). \quad (1)$$

Where $S_0(i, j, n_\lambda)$ is the three-dimensional input signal and $M(i, j, n_\lambda)$ is a function representing a combination of the modulator 3 and the dispersing element 5. The value $n_\lambda$ represents a spectral channel. The function $M(i, j, n_\lambda)$ will be dependent on the transparencies of the portions on the modulator 3, the spatial arrangement of the portions of the modulator 3, the dispersing element 5 and any other suitable factors. The function $M(i, j, n_\lambda)$ can be modelled as a series of 2D masks for each wavelength, each 2D mask being generated by the same constant spatially coded aperture mask $M^*(i, j)$ with an appropriate wavelength dependent shift.

Let us assume a one-to-one correspondence between the [i,j] space at the detector where $(i,j) \in R^{N_x} \times N_y$ and the [x,y] space at the coded aperture where $(x, y) \in \mathbb{R}^{N_x \times N_y}$.

As an example, when the dispersing means 5 causes a spatial shift $d(d\Delta\lambda_n)$ in the y direction (where $\Delta\lambda_n$ is $\lambda_n - \lambda_c$, the spectral shift of the wavelength $\lambda_n$ from a central wavelength $\lambda_c$) then:

$$M(x, y+d(\lambda_n+\lambda_c), \lambda_n) = M^*(x,y)$$

The 2D mask for each wavelength can be represented as a matrix $\{M^{(n_\lambda)}\}_{n_\lambda=1} \in \mathbb{R}^{N_x \times N_y}$. This allows the measurement z obtained by each pixel 25 to be written in matrix form as $$z = Hs, \quad (2)$$

where z is a $N_x N_y \times 1$ vectorized version of the measurement obtained by each pixel 25, that is: $[Z_{[1,1]}, Z_{[x,y]}, \ldots Z_{[N_x N_y]}]$ s is the $N_x N_y N_\lambda \times 1$ stacked vector of the three-dimensional input beam of light $S_0$ (x, y, $\lambda$), that is $[S_{[1,1],1}, S_{[2,1],1} \ldots S_{[x,y],1} \ldots S_{[N_x N_y],1} \ldots S_{[1,1],\lambda} \ldots S_{[x,y]\lambda} \ldots S_{[N_x N_y],\lambda} \ldots S_{[1,1],N_\lambda} S_{[2,1],N_\lambda} \ldots S_{[x,y]N_\lambda} \ldots [N_x N_y], N_\lambda]$ and $H \in \mathbb{R}^{(N_x N_y) \times (N_x N_y N_\lambda)}$ is the $(N_x N_y)$diagonal matrices:

$$H = [\text{Diag}(M^{(1)}), \ldots \text{Diag}(M^{(N_\lambda)})] \quad (3)$$

In examples of the disclosure s is the spectral domain signal provided by an OCT arrangement. This allows equation (2) to be rewritten as $$z = HFr \quad (4)$$

Where $r \in \mathbb{R}^{N_x N_y N_\lambda}$ denote the three-dimensional image of the object and F is the Fourier transform $F \in \mathbb{R}^{(N_x N_y N_\lambda) \times (N_x N_y N_\lambda)}$. The image can therefore be obtained by solving $$r = \arg \min_r \|z - HFr\|^2 + \tau R(r) \quad (5)$$

where R(r) denotes the regularizer imposed on the OCT image r, and r balances the two terms in equations (5). The regularizer R can, for example, be based upon total variation of the 3D image. Any suitable compressive sensing inversion algorithms may be used by processing means 12 to solve equation (5) to obtain the desired image. For example, non-linear optimization can be used to produce a three-dimensional image of the object.

The sparsity of the transfer function H that represents the combination of the spatial modulating means 3 and the dispersing means 5 (e.g. the spatially coded aperture and prism) causes information compression.

Figure 3:
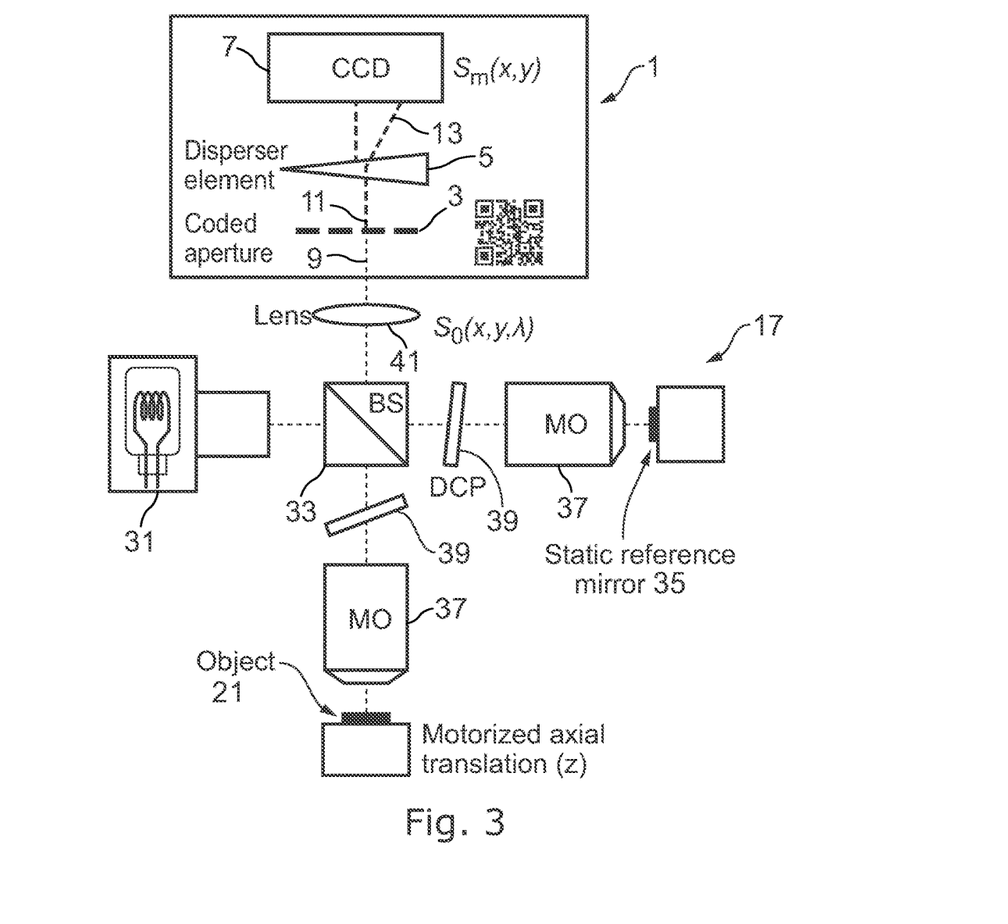
FIG. 3 illustrates an optical coherence tomography arrangement.

FIG. 3 illustrates an optical coherence tomography arrangement 17 and an apparatus 1 according to examples of the disclosure.

Optical coherence tomography (OCT) is also called low coherence light interferometry. A double path interferometer 17 comprising a sample path for an object 21 and a reference path. In this example, the double path interferometer arrangement 17 is used in a Michelson configuration to create interference between an optical beam reflected from an object 21 in the sample path and a reference optical beam in the reference path. The above described apparatus 1 can be used to detect the interference.

A double path interferometer, for example a Michelson interferometer, uses a beam splitter 33, to split a light from a light source 31 into two beams that travel at 90 degrees to each other along different paths—a sample (object) path and a reference path. In the Michelson interferometer, each of those light beams is reflected back toward the beam splitter 33 which then combines their amplitudes using the superposition principle. The resulting interference pattern is directed to the detector 7 via spatial modulating means 3 and dispersing means 5.

In this example, a light beam is reflected back from the object 21 and the other reference light beam is reflected back from a mirror 35.

The arrangement 17 is a compressive spectral optical coherence tomography (CS-OCT) arrangement that uses a spatial modulating means 3 before dispersing means 5 on the interference signal before detection of a spectrogram of overlapping differently masked spectrograms for different wavelength channels.

The detector 7 can detect the different wavelengths simultaneously so that all the information is recorded in single image (one-shot operation). The apparatus 1 therefore enables NA channel signals to be recovered from a single measurement. The detector 7 produces, in a single shot, without spatial or spectral scanning, spectral domain information 15 that can be used to produce a three-dimensional image of the object 21.

In this example there is full field illumination of the object 21 by light a beam over an area. A reflected beam of light from the object 21 provides full field illumination of a spatially coded aperture 9 over an area. The spatially coded light provides full-field illumination of a disperser element 5 over an area. The dispersed, spatially coded light 13 provides full field illumination of the detector 7 over an area that corresponds to an array of $N_x$ by $N_y$ pixels (sensels) in the detector 7.

The OCT arrangement 17 comprises a light source 31, a beam splitter 33, a static reference mirror 35, one or more microscope objectives 37, one or more compensators 39, and one or more focusing elements 41. The OCT arrangement 17 is a spectral domain arrangement. It uses a light source 31 of a fixed broad spectrum.

In examples of the disclosure the light source 31 is a broad band light source which provides light having a range of wavelengths. The wavelength of the light that is used may depend on the type of object 21 that is to be imaged or any other suitable factor. In some examples the light used may be infrared light. in some examples the wavelength of the light used may have a range of wavelengths between 400 nm and 1500 nm. The "centre wavelength" can be for example at 830 nm with a frequency range of 810 nm to 850 nm for a 40 nm bandwidth or the centre wavelength" can be 1300 nm with a frequency range of 1280 nm to 1320 nm for a 40 nm bandwidth or the centre wavelength" can be 1500 nm with a frequency range of 1480 nm to 1520 nm for a 40 nm bandwidth. Other centre wavelengths and other bandwidths are possible.

The output light beam from the light source 31 is incident on the beam splitter 33. The beam splitter 33 may comprise a prism, a half silvered mirror or any other suitable component.

In the OCT arrangement 17 half of the split beam provides the reference beam and is provided to the static reference mirror 33. A microscope objective 37 and a compensator 39 are provided between the beam splitter 33 and the static reference mirror 35. The microscope objective 37 may comprise any means which may be arranged to focus the beam of light. In some examples the microscope objective 37 may comprise one or more lenses or any other suitable optical elements. The compensator 39 may comprise a compensator plate or any other suitable compensating element. In the example of FIG. 3 the compensator 39 comprises a decoupling compensator polarizer.

The other half of the split beam provides the object beam and is provided to the object 21. The object 21 may be arranged to be moved along the z axis, but not during imaging. This axis may enable the focusing of the three-dimensional images provided by the OCT arrangement 17. In the example of FIG. 3 the object 21 is provided on a motorised arrangement so as to enable movement along the z axis between one-shot measurements. In other examples a manual arrangement, or any other suitable type of arrangement, could be used.

A microscope objective 37 and a compensator 39 are provided between the beam splitter 33 and the object 21. The microscope objective 37 may comprise any means which may be arranged to focus the beam of light. In some examples the microscope objective 37 may comprise one or more lenses or any other suitable optical elements. The compensator 39 may comprise a compensator plate or any other suitable compensating element. In the example of FIG. 3 the compensator 39 comprises a decoupling compensator polarizer.

The different wavelengths of the light provide coherence of the object beam and the reference beam at different optical path lengths. Therefore, the different wavelengths of light provide information about different depths within the object 21. Different features within the object 21 reflect the incident light by different amounts. The interference between the reflected object beam and the reflected reference beam therefore provides information about the features within the object 21.

As the different frequencies of light provide information about different depths within the object 21 this enables three-dimensional imaging of the object 21. The three-dimensional imaging 21 may enable different features at different depths within the object to be identified and/or analysed. This ensures that the information obtained in the examples of the disclosure comprises information about the internal structure of an object 21 and not just information about the surface of the object 21.

The OCT arrangement 17 also comprises one or more focusing elements 41. The focusing element 41 may comprise a lens or any other suitable means for focusing a beam of light. The focusing element 41 is arranged to focus the input beam of light 9 into the apparatus 1 for detecting.

In the example of FIG. 3 the apparatus 1 comprises a modulator 3, a disperser element 5 and a detector 7 as previously described. The input beam of light 9 provided to the apparatus 1 is from the OCT arrangement 17.

The compressive measurement (M) 15 captured by the detector 7 in FIG. 3 has three different terms:
a) a cross-correlation term (CC), which includes the desired inference pattern;
b) a self-correlation term of the object signal (SSC), which is dependent on the object;
c) a self-correlation term of the reference signal (RSC), which only dependent on the light source 31 being used and can be calibrated once for a fixed system.

Thus $$CC = M - SSC - RSC$$

It is therefore desirable to determine both SSC and RSC to modify the measurement 15 and obtain the desired interference signal CC.

The RSC term can be determined once for the arrangement 17 and used for different objects. The SSC term can be determined for each object.

Figure 4:
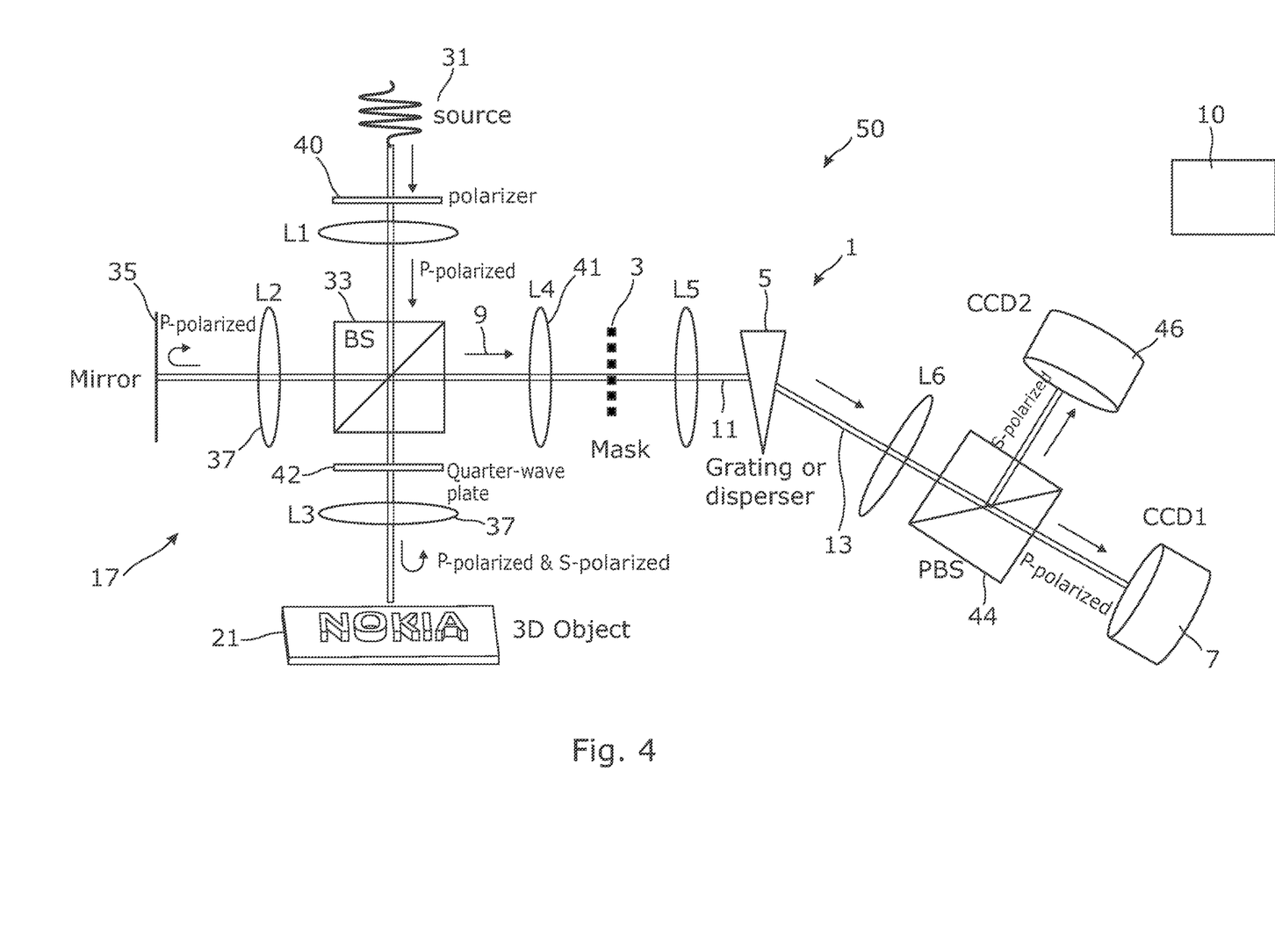
FIG. 4 illustrates an optical coherence tomography arrangement.

In the example of FIG. 4 the apparatus 1 comprises a modulator 3, a disperser element 5 and a detector 7 as previously described. The input beam of light 9 provided to the apparatus 1 is from the OCT arrangement 17. In this example, the system 50 comprising the interferometer arrangement 17 and the apparatus 1 is configured so that SSC can be determined. The system 50 is configured to capture the measurement M and the SSC term simultaneously. The system 50 can therefore operate at high speeds.

The system 50 uses, in addition to the elements described with reference to FIG. 3, a polarized light source, a phase plate 42, a polarizing beam splitter 44, and a second detector 46. The description provided for FIG. 3 is also relevant for FIG. 4.

The output light beam from the light source 31 is incident on a linear polarizer 40. This creates p-polarized light which is incident on the beam splitter 33. The beam splitter 33 may comprise a prism, a half silvered mirror or any other suitable component.

Half of the split p-polarized beam provides the reference beam and is provided to the static reference mirror 33. As previously described, a microscope objective 37 and optionally a compensator can be provided between the beam splitter 33 and the static reference mirror 35. The mirror 33 reflects the received p-polarized beam of light back to the beam splitter 33 as a reference.

The other half of the split p-polarized beam provides the object beam and is provided, via phase plate 42, to the object 21. A microscope objective 37 and a compensator can be provided between the phase plate 42 and the object 21. The phase plate creates elliptically polarized light.

The object 21 reflects the received elliptically polarized beam of light back to the beam splitter 33 via the phase plate 42.

The beam splitter 33 combines the p-polarized beam of light back received from the mirror 35 and the polarized beam of light received from the object 21 via the phase plate 42. The combined beam of light is directed in sequence via a spatial modulating means 3 and a dispersing means 5 to create a beam of dispersed, spatially modulated light 13.

The dispersed, spatially modulated light 13 is split by a beam splitter 44. One portion of the split beam is directed to the detector 7. The other portion of the split beam is directed to a second detector 46.

The second detector 46 is a detector similar to or the same as the detector 7.

The system 50 can comprise one or more focusing elements 41. The focusing element 41 may comprise a lens or any other suitable means for focusing a beam of light. The focusing element 41 is arranged to focus the input beam of light 9 into the spatial modulating means 3.

The polarizer 40 adjusts the polarization orientation of the incident light to p-polarized (0°) state. The phase plate rotates the polarization orientation of the light to between 0° and 90°.

The beam-splitter 44 is a polarizing beam-splitter (PBS) which reflects the component of light that is s-polarized (90°) into the detector 46 (e.g. CCD2) and transmits the component of light that is s-polarized into the detector 7 (e.g. CCD1).

The Jones vector for the light transmitted from the beam splitter 33 towards the phase plate 42 is:

$$v1 = \begin{matrix} 1 \\ 0 \end{matrix}$$

Jones matrix for phase plate 42 is:

$$Q = e^{-\frac{i\pi}{4}} \begin{bmatrix} \cos^2(\theta) + i\sin^2(\theta) & (1-i)\sin(\theta)\cos(\theta) \\ (1-i)\sin(\theta)\cos(\theta) & \sin^2(\theta) + i\cos^2(\theta) \end{bmatrix}$$

The fast axis of the phase plate is at an angle $\theta$ with respect to the horizontal (p-polarized) axis.

The Jones vector for the light transmitted from the phase plate 42 towards the object 21 is:

$$v2 = Q * v1$$

The Jones vector for the light transmitted from the object 21 is:

$$v3 = v2$$

The Jones vector for the light transmitted from the phase plate 42 towards the beam splitter 33 is:

$$v4 = Q * v3$$
$$= Q * v2$$
$$= Q * Q * v1$$
$$= H * v1$$

$H = Q*Q$ is the Jones matrix of a half-waveplate with fast axis at angle $\theta$ w.r.t the horizontal axis is:

$$H = e^{-\frac{i\pi}{2}} \begin{bmatrix} \cos^2(\theta) - \sin^2(\theta) & 2\sin(\theta)\cos(\theta) \\ 2\sin(\theta)\cos(\theta) & \sin^2(\theta) - \cos^2(\theta) \end{bmatrix}$$

Thus $v4 = H * v1 = \begin{matrix} \cos(2\theta) \\ \sin(2\theta) \end{matrix}$

This Jones vector represents a linearly-polarized light with its orientation $\phi = 2\theta$.

It has a p-polarization component $\cos 2\theta$. It has an s-polarization component $\sin 2\theta$.

Consider the power of the light source 31 after the polarizer 40 being $I_p$

Assume the Beam Splitter (BS) splitting the power to be $$\frac{I_p}{2}$$

on the reference arm and $$\frac{I_p}{2}$$

on the object arm.

The p-polarized (0°) light with power $$\frac{I_p}{2}$$

passes through the phase plate 42 will have an elliptically polarized state, which can be decomposed into a p-polarized (0°) component and an s-polarized (90°) component.

This elliptically polarized light is reflected by the object 21 and then pass though the phase plate 42 again. The reflected elliptically polarized light is converted back into linear polarized light with an 2θ. This linearly polarized light has passed through the phase plate with θ orientation twice, and thus will have the p-polarized (0°) component $$\frac{I_p}{2}$$

Rcos2θ and the s-polarized (90°) component $$\frac{I_p}{2}$$

R sin 2θ, where R is the reflection rate of the object.

The p-polarized (0°) light component is coherent with the light from the reference arm, which is also p-polarized (0°). The combined coherent p-polarized light produced by the beam splitter 33 has power $$\frac{I_p^2}{4}$$

Rcos2θ.

After passing the spatial modulating means 3 and the dispersing means 5, this coherent light passes the polarization beam splitter 44 and captured by the detector 7. The measurement M1 at the detector 7 comprises a CC measurement CC1, a SSC measurement SSC1 and a RSC measurement RSC1.

M1=CC1+RSC1+SSC1

The s-polarized (90°) light component is not coherent with the light from the reference arm, which is p-polarized (0°), due to different orthogonal polarization states. This incoherent light thus only contains the self-correlation (SSC) term from the object (with weight $$\frac{I_p^2}{4}$$

R sin 2θ).

The measurement M2 at the second detector 46 has a SSC measurement SSC2: M2=SSC2

The relationship between SSC1 and SSC2 is determined by the phase plate.

For p-polarization: SSC1=SSC*cos 2θ
For s-polarization: SSC2=SSC*sin 2θ
Where θ is the angle between the fast axis of the phase plate 42 and the p-polarization axis.

RSC1 can be determined using a shutter to the phase plate 42 and a separate measurement. The value M1 at the first detector when the shutter to the phase plate 42 is closed can be captured once and used for different objects 21.

Using M1=CC1+RSC1+SSC1, gives

CC1=M1−RSC1−SSC1 using M2=SSC2, SSC1=SSC*cos 2θ, SSC2=SSC*sin 2θ

CC1=M1−RSC1−(M2*cos 2θ/sin 2θ)=M1−RSC1−(M2/tan 2θ)

The determination of CC1 can be performed by the processing means 10 as M1, M2 are measured simultaneously, and RSC1 and θ are known parameters of the system 50.

The value CC1 can be used in place of the electrical output signal 14. It can, for example, be used to form the measurement vector z used in Equation (5).

It will be appreciated from the foregoing description that FIG. 4 illustrates an example of an apparatus 1 comprising:
a double path interferometer 17 comprising a sample path for an object 21 and a reference path;
a source 31, 40 of linearly polarized light for the double path interferometer;
a phase plate 42 positioned in the sample path;
means 33 for superposing the sample path and reference path to create a beam of light 9 for detection;
means 3 for spatially modulating the beam of light to produce a modulated beam of light 11;
means 5 for dispersing the modulated beam of light to produce a spatially modulated and dispersed beam of light 13;
a first detector 7;
a second detector 46; and
means 44 for splitting the spatially modulated and dispersed beam of light 13,
wherein light of a first linear polarization (p-polarization) is directed to the first detector 7 and light of a second linear polarization (s-polarization), orthogonal to the first linear polarization, is directed to the second detector 46.

The double path interferometer 17 is configured so that the sample path reflects from the object 21. The sample path passes through the phase plate 42 before reflection from the object 21 and also after reflection from the object 21.

The light provided to the phase plate from the beamsplitter 33 has a first linear polarization. The phase plate 42 is configured to convert light that has the first linear polarization and is travelling towards the object 21 to an intermediate elliptical polarization and is configured to convert light that has the intermediate elliptical polarization and is travelling back from the object to a linear polarization that has a linear polarization component that is orthogonal to the first linear polarization (parallel to the second linear polarization) and has a linear polarization component that is parallel to the first linear polarization (orthogonal to the second linear polarization).

The means 3 for modulating the input beam of light 9 comprises a two-dimensional spatially coded aperture comprising at least a first plurality of portions having a first transparency that are spatially distributed in two dimensions and at least a second plurality of portions having a second different transparency that are spatially distributed in two dimensions. The first portions and the second portions can be arranged in an array of non-overlapping pixelated portions and are arranged in rows and columns. The pixelated portions having different transparencies can be arranged in a random two-dimensional pattern.

The means 5 for dispersing the input beam of light provides dispersion in a single dispersion direction. The dispersion direction can be optically aligned with rows or columns of pixels in the first detector 7 and the second detector 46 and/or the dispersion direction can be optically aligned with rows or columns of modulating pixels in the means 3 for modulating. The means 5 for dispersing can comprise one or more refractive elements. The means 5 for dispersing can comprises at least one prism.

The source 31 of linearly polarized light can provide light that has a range of different wavelengths, the range being greater than 20 nm, for example between 20 nm and 50 nm. This broad range (bandwidth) of different wavelengths of light provides spectral domain information about different depths within the object 21 without spectral domain scanning.

The system 50 comprises the apparatus and also processing means 10 as part of the apparatus or otherwise. The system or apparatus comprises processing means 10 for modifying a measurement M1 from the first detector 7 by subtracting a re-scaled version (M2*cos 2θ/sin 2θ) of a measurement M2 from the second detector 46 and a system dependent correction RSC1. The modified measurement is CC. The processing means 10 is configured to re-scale the measurement M2 from the second detector using a parameter 8 defined by the phase plate 42. The processing means 10 is configured to re-scale the measurement M2 from the second detector 46 using tan 2θ. The fast axis of the phase plate 42 is at an angle θ relative to the first linear polarization direction. The processing means can be configured to process the modified measurement (from the first detector 7) CC to produce a three-dimensional image of the object 21.

In some examples a different apparatus 1 may be provided for each one of a different range of wavelengths. The different apparatus 1 can operate simultaneously in parallel. A single source of light can be used with different filters used to limit each apparatus 1 to a particular frequency range.

In some examples, the modulator 3 is arranged to be moveable relative to the other components of the apparatus 1 such as the disperser element 5 and the detector 7 between one shot measurements. The modulator 3 is arranged to move in a direction which is different to the direction in which the dispersing element 5 disperses the modulated beam of light 11. For example, as previously described, the disperser element 5 may disperse the light towards only a y direction and the modulator 3 is then moved perpendicularly in the x direction. The effective spatial modulator 3 used for each sequential measurement is an x-shifted version of the same modulator 3. Having multiple measurements being obtained sequentially may enable more information to be obtained than from one single measurement.

The electrical output 15 may be used for smart detection. The smart detection may comprise the use of algorithms, or any other suitable technique, to recognise features in the output signal 15. The smart detection can be performed by the processing means 10. In some examples, the output signal 15 may be used by the processing means 10 to reconstruct a three-dimensional image of the object 21, or at least part of the object 21.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
    a double path interferometer comprising a sample path for an object and a reference path;
    a source of linearly polarized light for the double path interferometer;
    a phase plate positioned in the sample path;
    means for superposing the sample path and reference path to create a beam of light for detection;
    means for spatially modulating the beam of light to produce a modulated beam of light;
    means for dispersing the modulated beam of light to produce a spatially modulated and dispersed beam of light;
    a first detector;
    a second detector;
    means for splitting the spatially modulated and dispersed beam of light, wherein light of a first linear polarization is directed to the first detector and light of a second linear polarization, orthogonal to the first linear polarization, is directed to the second detector; and
    processing means for modifying a measurement from the first detector by subtracting both a re-scaled version of a measurement from the second detector and a system dependent correction.

2. An apparatus as claimed in claim 1, wherein the double path interferometer is configured so that the sample path reflects from the object.

3. An apparatus as claimed in claim 2, wherein the sample path passes through the phase plate before reflection from the object and also after reflection from the object.

4. An apparatus as claimed in claim 1, wherein the double path interferometer is configured to provide linearly polarized light, that has a first linear polarization, to the phase plate and wherein the phase plate is configured to convert light that has the first linear polarization and is travelling towards the object to an intermediate elliptical polarization and is configured to convert light that has the intermediate elliptical polarization and is travelling from the object to a linear polarization that has a linear polarization component that is orthogonal to the first linear polarization.

5. An apparatus as claimed in claim 1, wherein the means for spatially modulating the beam of light comprises a two-dimensional spatially coded aperture comprising at least a first plurality of portions having a first transparency that are spatially distributed in two dimensions and at least a second plurality of portions having a second different transparency that are spatially distributed in two dimensions.

6. An apparatus as claimed in claim 5, wherein the first portions and the second portions are arranged in an array of non-overlapping pixelated portions and are arranged in rows and columns.

7. An apparatus as claimed in claim 1, wherein the means for dispersing the beam of light provides dispersion in a single dispersion direction.

8. An apparatus as claimed in claim 7, wherein the dispersion direction is aligned with rows or columns of pixels in the first detector and the second detector and/or the dispersion direction is aligned with rows or columns of modulating pixels in the means for modulating.

9. An apparatus as claimed in claim 1, wherein the means for dispersing comprises one or more refractive elements.

10. An apparatus as claimed in claim 1, wherein the means for dispersing comprises at least one prism.

11. An apparatus as claimed in claim 1, wherein the source of linearly polarized light provides light that has a range of different wavelengths, the range being greater than 20 nm, wherein the range of different wavelengths of light provides spectral domain information about different depths within the object without spectral domain scanning.

12. An apparatus as claimed in claim 1, wherein the processing means is configured to re-scale the measurement from the second detector using a parameter defined by the phase plate.

13. An apparatus as claimed in claim 1, wherein the processing means is configured to re-scale the measurement from the second detector using tan 2Q, where a fast axis of the phase plate is at an angle Q relative to the first linear polarization direction.

14. An apparatus as claimed in claim 1, wherein the processing means is configured to process the modified measurement from the first detector to produce a three-dimensional image of the object.

15. An apparatus comprising:
a double path interferometer comprising a sample path for an object and a reference path;
a source of linearly polarized light for the double path interferometer;
a phase plate positioned in the sample path;
a beam splitter configured to superpose the sample path and reference path to create a beam of light for detection;
one or more modulators configured to spatially modulate the beam of light to produce a modulated beam of light;
one or more disperser elements configured to disperse the modulated beam of light to produce a spatially modulated and dispersed beam of light;
a first detector;
a second detector;
another beam splitter configured to split the spatially modulated and dispersed beam of light, wherein light of a first linear polarization is directed to the first detector and light of a second linear polarization, orthogonal to the first linear polarization, is directed to the second detector; and
a processor or controller configured to modify a measurement from the first detector by subtracting both a re-scaled version of a measurement from the second detector and a system dependent correction.

16. An apparatus-system as claimed in claim 15, wherein the processor or the controller is configured to re-scale the measurement from the second detector using a parameter defined by the phase plate.

17. An optical coherence tomography apparatus comprising:
a double path interferometer comprising a sample path for an object and a reference path;
a source of linearly polarized light for the double path interferometer;
a phase plate positioned in the sample path;
a beam splitter configured to superpose the sample path and reference path to create a beam of light for detection;
a first detector;
a second detector; and
another beam splitter configured to split the beam of light for detection, wherein light of a first linear polarization is directed to the first detector and light of a second linear polarization, orthogonal to the first linear polarization, is directed to the second detector; and
a processor or controller configured to modify a measurement from the first detector by subtracting both a re-scaled version of a measurement from the second detector and a system dependent correction.

18. An optical coherence tomography apparatus as claimed in claim 17, wherein the another beam splitter is configured to split the beam of light for detection that has been spatially modulated and dispersed.

* * * * *